United States Patent
Cusack et al.

(10) Patent No.: US 11,840,490 B2
(45) Date of Patent: Dec. 12, 2023

(54) SOIL AMENDMENT AND FERTILIZER COMPOSITION

(71) Applicant: DICALITE MANAGEMENT GROUP, INC., Bala Cynwyd, PA (US)

(72) Inventors: Derek Cusack, Bala Cynwyd, PA (US); Eric Appelbaum, Bala Cynwyd, PA (US)

(73) Assignee: Dicalite Management Group, Inc., Bala Cynwyd (PA)

( * ) Notice: Subject to any disclaimer, the term of this patent is extended or adjusted under 35 U.S.C. 154(b) by 0 days.

(21) Appl. No.: 17/177,807

(22) Filed: Feb. 17, 2021

(65) Prior Publication Data

US 2021/0387926 A1 Dec. 16, 2021

Related U.S. Application Data

(60) Provisional application No. 63/038,039, filed on Jun. 11, 2020.

(51) Int. Cl.
*C05G 3/80* (2020.01)
*A01G 24/15* (2018.01)
(Continued)

(52) U.S. Cl.
CPC .............. *C05G 3/80* (2020.02); *A01G 24/15* (2018.02); *C05G 1/00* (2013.01); *C09K 17/02* (2013.01); *A01G 24/23* (2018.02); *A01G 24/28* (2018.02)

(58) Field of Classification Search
CPC . C05G 3/80; C05G 1/00; A01G 24/15; A01G 24/23; A01G 24/28; C09K 17/02; C05D 1/04
See application file for complete search history.

(56) References Cited

U.S. PATENT DOCUMENTS 3,769,065 A 10/1973 Dunn
4,328,025 A 5/1982 Whitcomb
(Continued)

FOREIGN PATENT DOCUMENTS

CN 105330467 A * 2/2016 ............... C05D 9/00
CN 106588487 A * 4/2017 ............... C05D 9/00
(Continued)

OTHER PUBLICATIONS

Choi, Jong Myung et al., "Optimization of Substrate Formulation and Mineral Nutrition during the Production of Vegetable Seeding Grafts", Horticulture, Environment, and Biotechnology, 2012, 53(3): 212-221.

(Continued)

Primary Examiner — Wayne A Langel
(74) Attorney, Agent, or Firm — Dorsey & Whitney LLP

(57) ABSTRACT

Disclosed herein are soil amendments, generally in the form of coated perlite compositions, as well as methods of making and using the same. The disclosed compositions, methods, and systems provide for various beneficial enhancements to plants growth and soil health, and may decrease costs, for example by avoiding the need for multiple treatments. The presently disclosed compositions, methods, and systems also aid in prolonging release of plant nutrition into the soil (including silica), enhancing aeration, water retention, and drainage, resisting soil compaction, providing for pest and insect control, etc. In many embodiments, the disclosed coated perlite composition is a sterile composition, that is lightweight, and has a low dust content, which may provide for efficient and low-cost handling and transport of products comprising same. The disclosed coated perlite compositions comprise perlite particles having a coating of a mixture of diatomaceous earth phosphorous and may also include one or more of nitrogen, phosphorus, and potassium in the coating.

20 Claims, 3 Drawing Sheets

(51) Int. Cl.
*C05G 1/00* (2006.01)
*C09K 17/02* (2006.01)
*A01G 24/28* (2018.01)
*A01G 24/23* (2018.01)

(56) References Cited

U.S. PATENT DOCUMENTS

| | | | |
|---|---|---|---|
| 5,578,121 A * | 11/1996 | Eder | C09K 17/04 |
| | | | 428/404 |
| 5,725,630 A | 3/1998 | Roberts et al. | |
| 5,984,994 A | 11/1999 | Hudson | |
| 6,311,426 B1 | 11/2001 | Mehta et al. | |
| 2004/0089042 A1 | 5/2004 | Henderson | |
| 2012/0220454 A1* | 8/2012 | Chen | A01N 25/00 |
| | | | 514/517 |
| 2014/0206535 A1* | 7/2014 | Faust | C05G 3/60 |
| | | | 427/212 |
| 2015/0052960 A1* | 2/2015 | Makin | C05G 3/00 |
| | | | 71/30 |
| 2017/0096375 A1* | 4/2017 | Kim | A01G 17/02 |

FOREIGN PATENT DOCUMENTS

| | | | | |
|---|---|---|---|---|
| CN | 107226736 A * | 10/2017 | | C05D 9/00 |
| DE | 3021377 A1 | 12/1981 | | |
| DE | 3817276 A1 | 1/1989 | | |
| DE | 102005031397 A1 | 1/2007 | | |
| KR | 20060003837 A | 1/2006 | | |
| KR | 20180119724 A | 11/2018 | | |
| WO | WO 2014/036572 A2 * | 3/2014 | | C09C 3/10 |
| WO | WO 2016/162783 A1 * | 10/2016 | | C09K 17/40 |
| WO | 2018175821 A1 | 9/2018 | | |
| WO | 2019098854 A1 | 5/2019 | | |

OTHER PUBLICATIONS

Dyer, M.H, "Formula for Mixing Starter Soil", SF Gate, Home Guides, Garden, Garden Care, https://homeguides.sfgate.com/formula-mixing-starter-soil-72894.html, Accessed Mar. 25, 2020 (8 pages).
Kelley, Kathleen M. et al., "Homemade Potting Media", Penn State Extension, Oct. 22, 2007, https://extension.psu.edu/homemade-potting-media (5 pages).
Slim, Jenn, "Best soil and fertilizer for cacti and succulents", Succulent Plant Care, https://succulentplantcare.com/best-soil-and-fertilizer-for-cacti-and-succulents/, Accessed: Mar. 25, 2020 (12 pages).
Traunfeld, Jon et al., "Soil Amendments and Fertilizers: Fertilizing Guidelines Included by Plant Group", University of Maryland, Extension: Solutions in your community, Home & Garden Information Center, HG 42, 2013 (8 pages).
Examination Report dated May 16, 2022 in connection with Canadian patent application No. 3,109,030, 5 pages.
International Search Report and Written Opinion for International application No. PCT/US2021/018384 dated May 25, 2021, 12 pages.

* cited by examiner

SOIL AMENDMENT AND FERTILIZER COMPOSITION

CROSS-REFERENCE TO RELATED APPLICATIONS

This application claims benefit of priority pursuant to 35 U.S.C. § 119(e) of U.S. provisional patent application No. 63/038,039 entitled "SOIL AMENDMENT AND FERTILIZER COMPOSITION," filed on Jun. 11, 2020, which is hereby incorporated by reference in its entirety.

FIELD

The disclosed processes, methods, and systems are directed to soil amendments and conditioners with fertilizer properties, for enhanced plant growth.

BACKGROUND

Organic and inorganic soil amendments are materials added to a soil or soilless mix to improve one or more characteristics thereof. For example, soil amendments may be added to a potting or growth media to improve water retention, permeability of the media, water drainage, aeration and/or structure. In many cases, the amendment may aid in root health and/or growth.

Soil amendments should, preferably, be distributed throughout the media to ensure that they are available to the plant and do not interfere with the movement of air, water, and nutrients within the media. If more than one soil amendment, conditioner, fertilizer, or additive is added to a media, the process of mixing, to ensure proper distribution, may become more complex.

What is needed is a composition which provides for beneficial amendment to plant growth media, including soils and soilless media, that can be easily added to the media, and provides for additional benefits.

SUMMARY

Disclosed herein are soil amendments in the form of coated perlite compositions, as well as methods of making and using same, that provide for various beneficial enhancements to plants and soil. In many embodiments, the disclosed compositions, methods, and systems aid in enhancing plant growth, release of plant nutrition into the soil, regulation of soil moisture content, pest and insect mitigation, and other benefits.

In other embodiments, the disclosed compositions, methods of using and making said compositions, provide for surprisingly improved perlite compositions. In many embodiments, the disclosed perlite compositions may have an enhanced size due to a coating of diatomaceous earth. In some embodiments, the coating may also include one or more fertilizer compositions. The disclosed improved perlite compositions may aid in enhancing a media's retention and management of water, as well as aeration and porosity. In many embodiments, the disclosed perlite compositions may provide for delivery of plant-accessible nutrients, including silica, while also combating pests, insects, and microbes. In many embodiments, the disclosed improved perlite compositions may provide for enhanced root growth and health, plant growth and health, and plant yield. In some embodiments, the rate of growth for plants in media comprising the disclosed improved perlite compositions, may be more rapid, and yield of fruit, flowers, compounds, and other products may increase.

Plant available silica from diatomaceous earth ("DE")—AAPFCO registration guidelines—is important for root health and imparting rigidity and integrity to the plant's root system.

The disclosed coated perlite composition may be a sterile composition. In many embodiments, the disclosed coated perlite composition is lightweight and has a low amount of dust, which may reduce or avoid the need for special handling, and associated expenses. In conjunction with the other beneficial characteristics, the disclosed coated perlite composition may cost less to use (e.g. fewer soil treatments and/or applications).

Also disclosed herein are fertilizer compositions comprising perlite particles, a diatomaceous earth, and, in some embodiments, one or more of nitrogen, phosphorous, and potassium. In many embodiments, the perlite particles are coated with diatomaceous earth, and, in some cases a fertilizer compound, for example nitrogen, phosphorous, and/or potassium. In some embodiments, the disclosed composition may further include a surfactant that may aid in coating the perlite with diatomaceous earth. In some embodiments, the disclosed composition may be formed into pellets or other compacted forms for ease of transport, handling, use and/or application.

Also disclosed herein are methods and systems for manufacturing fertilizers comprising, combining a diatom composition with perlite, and then mixing the perlite and diatom composition to coat the perlite. In some embodiments, liquid fertilizer may be added to the diatom composition and/or the coated perlite. In various embodiments, the coating may be continuous, non-continuous, uniform, or non-uniform.

DETAILED DESCRIPTION

Figure 1:
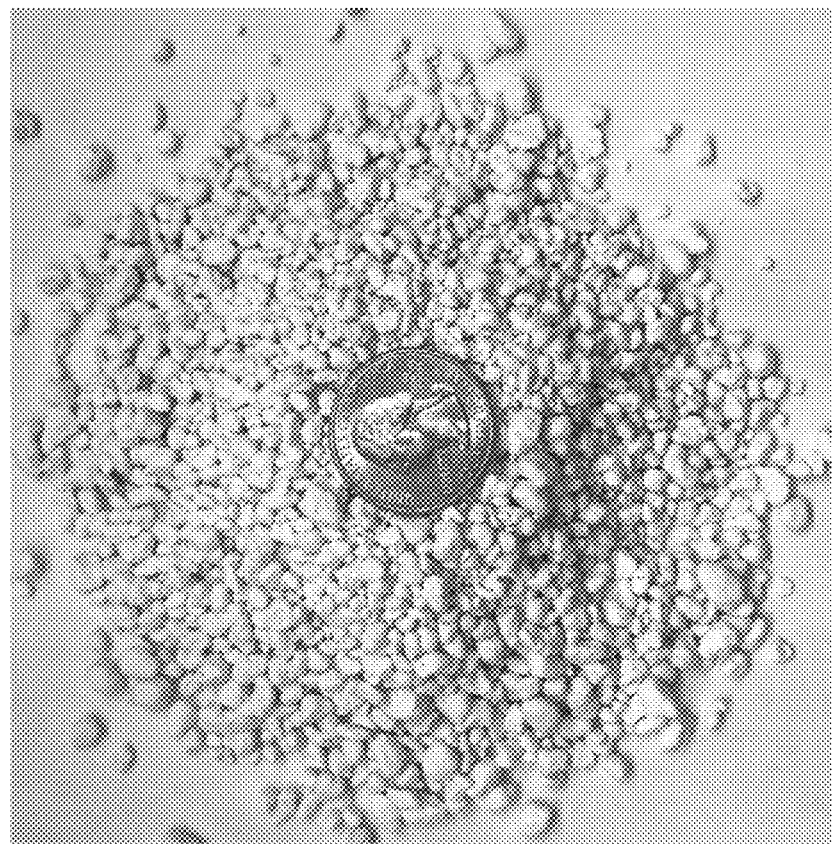
FIG. 1 depicts an uncoated perlite for use in making the disclosed coated perlite composition.
Figure 2:
FIG. 2 is a photo of an embodiment of the presently disclosed coated perlite composition.

The present disclosure relates to a composition for improving soil health and/or enhancing plant growth. In some embodiments, the disclosed compositions and methods may provide benefits to soil and plants by use of natural components, such that the composition may be suitable for growth or treatment of organic products, plants, etc. In many embodiments, the present disclosure relates to a composition comprising perlite, and diatomaceous earth. In various embodiments, the disclosed composition may include one or more fertilizer compounds (e.g. nitrogen, phosphorus, and potassium) in the coating. In most embodiments, the perlite comprises a coating of diatomaceous earth, and aids in enhancing plant growth and/or soil health.

Growing plants in soil may result in transfer of harmful bacteria and other microbes from the soil to the plant. To avoid this problem, soilless growing media may be used. Soilless media is, generally, cleaner and may be referred to as 'sterile,' and is especially useful for growth in containers. In some cases, plants grown in containers may be located indoors with controlled environments.

In some cases, plants grown in soilless media may be grown hydroponically. In many cases, hydroponic growth may include one or more inert media such as, without limitation, coco fiber (coir) or chips (croutons), perlite, vermiculite, diatomaceous earth, rock wool, clay pebbles or balls, growstones, peat (for example sphagnum peat moss), sand, woodchips, sawdust, pebbles, gravel, and other media. In many cases, soilless grow media may be comprised of organic or inorganic materials, and may be mixed together, including with fertilizers, to aid in plant growth and soil health. Generally, soil amendments in combination with soilless media may provide support for the growth of the plant, especially for the root.

In some cases, the soil around a plant or tree may receive an amendment, such as a soilless media to help improve characteristics of the soil. However, in most cases, soilless media serves as a base grow media for hydroponic growing. Fertilizers are often used in hydroponic growth to provide at least one plant-required nutrient (e.g. nitrogen, phosphorus, potassium, and/or sulfur) that may, after uptake, aid in plant or tree growth. In many cases, the fertilizer components may be water soluble and may be lost from the grow media upon contact with water.

Potting or container mixes are sterile, soilless media that retains moisture, resists compaction (allowing growth of roots), drains excess water, and provides for aeration. Because it is sterile, it generally does not include other plants (e.g. weeds), pests, insects, mold, or other plant pathogens. Potting mixes can be comprised of various types of soilless media, depending upon the desired attributes and characteristics of the plant. In many cases, the potting mix may comprise peat moss or coir fiber, perlite or vermiculite, and sometimes a slow release fertilizer, or compost material.

Various natural soil amendments are known. For example, perlite is a silicon-based volcanic rock that may be mined from the earth. When extracted, crushed, and heated (to between about 1,300 and 1,800° F.), the rock expands, giving perlite a larger surface area to mass ratio that, when added to soil, provides for both enhanced water retention, and enhanced water drainage. Perlite is also highly crush-resistant and imparts compaction resistance to soils, which also benefits drainage, and provides for easier growth of plant roots.

Perlite for use with the presently disclosed compositions may be various sizes. In most embodiments the Perlite may have a size larger than about 60 mesh, such that about 95%, 90%, 80%, 70%, 60%, 50%, 40%, 30%, 20%, 10%, 5%, or 1% of the particles are greater than about 50 mesh, 40 mesh, 30 mesh, 20 mesh, 10 mesh, 9 mesh, 8 mesh, 7 mesh, 6 mesh, 5 mesh, 4 mesh, 3 mesh, or 2 mesh. In some embodiments, the perlite may be selected from Perlite™, DICAPERL™, or AEROSOIL™ (Dicalite Management Group, Inc.; West Conshohocken, PA) and the size distribution may be as shown below.

TABLE 1

| FINISHED | 4 Mesh | 1% |  |
| HORT | 6 Mesh | 10% |  |
|  | 8 Mesh | 40% |  |
|  | 16 Mesh | 75% |  |
|  | 30 Mesh | 90% |  |
|  | 50 Mesh | 95% |  |
|  | Pan |  | 10% |

In some embodiments, the perlite may have a composition as shown below, in Tables 2 or 3.

TABLE 2

| $SiO_2$ (Amorphous) | 69-73% |
| $Al_2O_3$ | 12-13% |
| $Na_2O$ | 5-6% |
| $K_2O$ | 3-4% |
| CaO | 1-2% |
| $Fe_2O_3$ | 0.5-1% |
| MgO | 0.2-0.5% |
| MnO | 0.1-0.5% |
| $TiO_2$ | 0.0-0.1% |
| $P_2O_5$ | <0.05% |
| Zn | <0.05% |
| Rb | <0.05% |
| Ba | <0.01% |
| V | <0.01% |
| Sr | <0.01% |

TABLE 3

| Element | Percentage by XRF |
| --- | --- |
| $SiO_2$ | 80-92% |
| $Na_2O$ | 0.1-0.8% |
| $Al_2O_3$ | 2.5-6.0% |
| $Fe_2O_3$ | 1.0-3.0% |
| $SO_3$ | 0.03-0.3% |
| MgO | 0.1-0.8% |
| CaO | 0.3-3.0% |
| $K_2O$ | 0.3-1.0% |
| $P_2O_5$ | 0.05-0.2% |
| ZnO | <0.1% |

Diatomaceous earth is, like perlite, naturally occurring and mined from the earth. Also known as "DE" or "diatomite" (also known as "Kieselghur" or "Kieselgur" in some international markets) it refers to geologic sediments comprising mostly silica-based skeletons of single-celled aquatic diatoms. Diatoms represent a diverse array of microscopic golden-brown algae, having intricate and ornate skeletons. Diatoms are found in fresh water as well as salt water. Freshwater diatomite is generally mined from dry, former, and sometimes ancient lakebeds. In general, the freshwater-sourced DE has a low crystalline silica content and a high iron content, while diatomite from saltwater sources has a high crystalline silica content and a low iron content. In addition, saltwater-sourced diatomite may comprise high levels of toxic heavy metals, such as lead, mercury, chromium, etc. In contrast, freshwater-sourced diatomite tends to have lower levels of such compounds.

Among other uses, DE may be used as a garden treatment. In most cases, DE is used to control insects (flies, ants, aphids, etc.) and pests (e.g. snails). However, DE can also be used to enhance water retention and drainage. In some cases, DE may calcined, which aids in the diatomaceous earth binding to nitrogen containing compounds and slowing their release.

The disclosed diatomaceous earth may be used to reduce or prevent growth of various pests. In some embodiments, the diatomaceous earth may inhibit or prevent growth of fungus gnat larvae. For example, the edges of the diatom may act to injure, wound, puncture, or score to growing gnat larvae, this may result in the larvae leaking body contents and cause the larvae to wither and eventually die.

The disclosed diatomaceous earth may also provide elemental silicon to the plant. In many cases, elemental silicon may help to increase the integrity of the plant's cell wall, especially in the root. Silica is a main component of diatomaceous earth. In plant tissues, silica is a main component of the cell wall, imparting structural integrity and reducing amino acid leakage from the intact cells and membranes of the plant tissues. This reduction of amino acid release contributes to a reduction of pest pressure, especially from sucking and/or chewing insects. The disclosed compositions and methods may be used to enhance silica uptake in a plant, wherein uptake of silica increases more than about 0.1%, 1.0%, 2.0%, 3.0%, 4.0%, 5.0%, 6.0%, 7.0%, 8.0%, 9.0%, 10.0%, 20.0%, 30.0%, 40.0%, 50.0%, 60.0%, 70.0%, 80.0%, or 90.0%, and less than about 200.0%, 100.0%, 90.0%, 80.0%, 70.0%, 60.0%, 50.0%, 40.0%, 30.0%, 20.0%, 10.0%, 9.0%, 8.0%, 7.0%, 6.0%, 5.0%, 4.0%, 3.0%, 2.0%, or 1.0%.

The diatomite for use in coating perlite of the presently disclosed coated perlite composition, may possess various characteristics. In many embodiments the diatomite may be sourced from freshwater deposits and have a mean pore diameter (mpd) of between about 1 and 50 microns ($\mu$m), for example about 10-25 microns, or about 13-19 microns. The DE particles may have various sizes, in most cases greater than about 500 mesh, for example greater than 400 mesh. Diatomaceous earth may comprise mostly silica but may also include various trace nutrients such as iron, calcium, magnesium, and others that may benefit soil health and plant growth. In various embodiments, the DE may be classified as Natural, or Food Chemicals Codex grade, and meet the requirements outlined by USP. In some embodiments, the diatomaceous earth may be NutriDE™ or other Codex-compliant DE.

As used herein, a coating may refer to a continuous, discontinuous, even, uneven, uniform, or non-uniform layer or covering. In many embodiments, the disclosed coatings may be applied to a particle of perlite to create a coated perlite. In many embodiments, as used herein, the coating refers to a layer of, at least, diatomaceous earth applied to a perlite particle. In many embodiments, the presently disclosed coatings may include, along with diatomaceous earth, one or more fertilizer compounds.

Fertilizers may be from natural or synthetic sources. Synthetic fertilizers may be manufactured from gasses, chemicals, and/or other sources. Organically derived fertilizers may be manufactured from living matter and/or other natural materials such as ash or various mineral deposits. While synthetic fertilizers may enhance plant growth, they may not benefit soil health, whereas many organic and natural fertilizers, in addition to providing plant-available nutrients, may also help soil health, for example by enhancing aeration, moisture content management, compaction, and/or the microbiome.

Slow-release may refer to the ability of a composition, compound, particle, etc., to retain another compound, such as one or more fertilizer compounds, over time, slowly releasing the one or more fertilizer compounds into the soil over an extended period of time. The total period of time over which all, or most, of a fertilizer compound is 'released' may vary. The proportion of the total amount of fertilizer compound release over any sub-period of time may also vary—that is the rate of release may vary over time.

Fertilizer compounds may include various elements, compounds, and molecules that may be required by a plant for efficient growth, such as sulfur, nitrogen, phosphorous, potassium, and compound comprising these elements. In some embodiments, the fertilizer composition may include nitrogen, phosphorous, and potassium in approximately equivalent amounts, or may be lacking one or more of these elements or element-containing compounds. In some embodiments, the fertilizer composition may have an N—P—K rating of 0-10-10. N—P—K ratings represent the percentage of nitrogen ("N"), phosphorous ("P"), and potassium ("K") in a given fertilizer mix, such that a fertilizer with a rating of 0-10-10 may comprise 0% nitrogen, 10% phosphorous, and 10% potassium. N may be in the form of various nitrogen compounds, such as urea or ammonium nitrate: P may be in the form of elemental phosphorous or phosphorus-containing compounds; and K may be in the form of elemental potassium or potassium-containing compounds, such as potash. The fertilizer compounds, as used herein may be either liquid or dry form. Fertilizer compositions (FC) may be a liquid fertilizer ("LF") or dry fertilizer ("DF") and may comprise various combinations of N—P—K.

The disclosed composition may be manufactured in various ways. In some embodiments, a liquid fertilizer (LF) formulation may have an NPK rating of 0-10-10, and may be combined with diatomaceous earth to create a DE+LF composition, and then the DE+LF composition may be combined with the perlite. In many embodiments, the DE is combined with the perlite, without a liquid fertilizer, or the liquid fertilizer may be combined with the coated perlite. In some embodiments, for example those that include a coating of DE+LF, the ratio of perlite to DE to liquid fertilizer, or LF, (i.e. perlite:DE:LF) may be about 10-20 ft$^3$: 1-3 ft$^3$; 0.05-0.5 ft$^3$ (0.5-3 gallons), in some embodiments the ration may be about 16:2:0.13, wherein 0.13 cubic foot is approximately one gallon. In most embodiments where the coating does not include a fertilizer component, the ratio of perlite:DE may be about 20:1-3:1, or about 10:1 to 10:3, or about 20:1 to about 20:3, by volume, for example from about 30:1, 25:1, 20:1, 19:1, 18:1, 17:1, 16:1, 15:1, 14:1, 13:1, 12:1, 11:1, 10:1, 9:1, 8:1, 7:1, 6:1, 5:1, 4:1, 3:1, or 2:1, to about 1:1, 2:1, 3:1, 4:1, 5:1, 6:1, 7:1, 8:1, 9:1, 10:1, 12:1, 13:1, 14:1, 15:1, 16:1, 17:1, 18:1, 19:1, 20:1, 25:1, or 30:1, by volume. In some embodiments, a LF may be combined with DE and water to create a DE+LF mixture, then that DE+DF mixture may be combined with perlite to create a DE+LF coating on the perlite. In some embodiments, DE may be combined with water and then coated onto the perlite.

Other methods of coating perlite are also disclosed. In many embodiments, a liquid may be added to wet expanded perlite particles, and then DE may be added to coat the perlite and create a mixture of perlite coated with DE. In some embodiments, a fertilizer compound may be in the liquid. In some embodiments, LF may be applied to the expanded perlite mixture to wet the perlite particles, and then DE may be added to coat the perlite and create a mixture of perlite, fertilizer, and DE. In some embodiments, the mixture is then mixed in a large drum, belt, an/or screw mixer, until the perlite has been coated with the DE particles. In many embodiments, coating by mixing may result in a non-uniform layer of DE covering the expanded perlite. In other embodiments, the coating is generally uniform.

The disclosed composition, methods, and systems may benefit plant growth in various ways. In many embodiments, the disclosed compositions and methods may aid in soil aeration, water retention, and/or drainage. In many embodiments, the introduction of the disclosed compositions into a soil may increase soil aeration, soil water retention, and/or soil water drainage by at least about 10% compared to soil lacking the disclosed composition, for example a soil containing the same amounts of components, that are not added as a coated perlite composition. In various embodiments, soil characteristics may be enhanced by more than about 10%, 15%, 20%, 25%, 30%, 40%, 50%, 60%, 70%, 80%, 90%, or 100%, and less than about 500%, 100%, 90%, 80%, 70%, 60%, 50%, 40%, 30%, 20%, or 150%, compared to soil lacking the disclosed coated perlite composition, for example soil comprising the same concentration of uncoated components.

The disclosed coated perlite composition may also benefit soil and plant health by providing natural and organic amendments to the soil. In most embodiments, the disclosed coated perlite composition comprises only naturally occurring components. In most embodiments the components of the coated perlite composition are organic, for example the coated perlite composition is an organic mineral aggregate. In most embodiments, the coated perlite composition has a neutral pH, for example a pH between about 6 and 8, for example about 6.8, 6.9, 7.0, 7.1, 7.2, 7.3, 7.4, 7.5, 7.6, 7.7, or 7.8. In many embodiments, the disclosed coated perlite composition makes up 1 of 4 natural soil components.

The disclosed coated perlite composition may provide for other beneficial characteristics. In many embodiments, the disclosed coated perlite composition is a sterile composition. In many embodiments, the disclosed coated perlite composition is lightweight and has a low amount of dust, which may provide for efficient and low-cost handling and transport. In conjunction with the other beneficial characteristics, the disclosed coated perlite composition may cost less to use, while providing superior plant and soil nutrition over longer periods of time. In addition to providing the above mentioned N—P—K to the soil, the disclosed coated perlite composition may also be an excellent source of plant-available silicon.

The disclosed coated perlite composition may provide for enhanced plant growth in a soil comprising the composition, as compared with a soil lacking the coated perlite composition, for example one comprising the individual components in uncoated form. In many embodiments, the disclosed coated perlite compositions and methods may improve on or more plant growth characteristics selected from emergence, greenness, height, weight, color, yield, root weight, disease resistance, stress tolerance, etc. In many embodiments, the enhanced characteristics may increase by more than about 0.1% 1% 2% 3% 4% 5% 6% 7% 8% 9% 10%, 15%, 20%, 25%, 30%, 40%, 50%, 60%, 70%, 80%, 90%, 100%, 150% or 200% and less than about 500%, 200% 100%, 90%, 80%, 70%, 60%, 50%, 40%, 30%, 20%, 15%, 10% 9% 8% 7% 6% 5% 4% 3% 2% or 1% compared to soil lacking the disclosed coated perlite composition, for example soil comprising the same concentration of uncoated components. In various embodiments the plant may be selected from ornamental and productive land plants, green plants, flowering plants, conifers, ferns, cycads, etc. In many embodiments, the plant maybe various types including basil, tomato, *Arabidopsis*, or a member of the genus *Cannabis*, for example *C. sativa* or *C. indica*.

The disclosed perlite composition may improve one or more characteristics of soil health. In some embodiments, the disclosed coated perlite composition and uses thereof may aid in enhancing one or more of moisture content, pH, electrical conductivity, compaction, microbe diversity, microbe density, nutrient content, etc.

EXAMPLES

Example 1—Enhancement of Plant Growth

When added to soil comprising one or more plants, the presently disclosed coated perlite composition substantially outperforms a (1) perlite-only soil mixture and (2) a soil mixture comprising the individual components of the coated perlite. In many embodiments, use of the disclosed coated perlite composition may enhance plant germination, plant yield, plant size, speed to maturity, etc. In addition, use of the disclosed coated perlite composition may aid in increasing plant resistance to various stressors (e.g. heat, cold, moisture, drought, pests, insects, mold, etc.

Plants were separated into various groups with substantially equivalent numbers of individual plants per group, and grown under the following conditions for 12 weeks, at which time the remaining plants were collected for analysis. Specifically, plants started as cuttings were grown in 3 gallon containers under controlled conditions: about 75° F. during the day and about 65° F. at nights on a 16 h day/8 h night schedule for weeks 0-8, then a 12 h day/12 h night schedule for weeks 8-12. Other temperature and light schedules may be selected based on the type of plant being tested, and the desired growth rate. Watering, by drip, was performed daily. Planting soil comprised 80% peat, 250 grams dolomitic lime, and, optionally, 17 grams Aquatrol (a wetting agent) per cubic foot of mix. Depending upon the group being tested, the soil also contained 20% of (1) the presently disclosed coated perlite composition, (2) perlite only, or (3) individual components of the presently disclosed coated perlite composition, with groups (2) and (3) being control groups.

Analysis of the groups was performed at the completion of 4 and 8 weeks of growth. A number of plants were removed for testing at those times. At the end of week 4, plants were processed for one or more of (1) plant height, and (2) shoot dry weight; photos of the plants were taken, and the soil tested for one or more of (1) pH and (2) electrical conductivity. At the end of week 8, plants were processed for (1) plant height, (2) shoot dry weight, and (3) leaf tissue nutrient analysis (e.g. one or more of P, N, K, Mg, and Ca content); photos of the plants were taken, and the soil again tested for (1) pH and (2) electrical conductivity.

At the end of week 12 the experiment was completed and plants tested for (1) plant height, (2) shoot dry weight, (3) flower bud dry weight, (4) leaf tissue nutrient analysis, (5) CBD Yield, (6) CBD concentration, (7) terpene yield (Myrcene, Lemonene, Beta-Carophyllene), and (8) terpene concentration (Myrcene, Lemonene, Beta-Carophyllene). Photos of the plants were taken, and the soil tested for (1) pH (2) electrical conductivity, and (3) nutrient levels (e.g one or more of P, N, K, etc.).

The disclosed compositions and method are shown to enhance plant and soil characteristics by at least 5% over soils lacking the disclosed coated perlite composition.

Example 2—Comparison of Present Composition/Product to Uncoated Perlite+Peat-Based Additives in Container Test Container studies were performed with the disclosed composition of DE-coated perlite compositions. Hemp (CBD targeted autoflower) plants were container grown for 12 weeks after planting using a media of peat moss. Various mixtures, including the presently disclosed composition was added to the media. After growth, the plants were harvested and several characteristics of these plants was analyzed and compared. The results are presented below, in Table 4 and in FIG. 3. Table 4 shows average % change for various plant characteristics for grown in the presently disclosed composition versus perlite and peat moss alone ("Perlite Only" vs "Peat Moss Only").

TABLE 4

| Leaf Weight | +65% |
| CBD Total Yield | +61% |
| Stem Wt | +53% |
| Dried Flower Wt | +42% |
| Root Mass | +41% |

Figure 3:
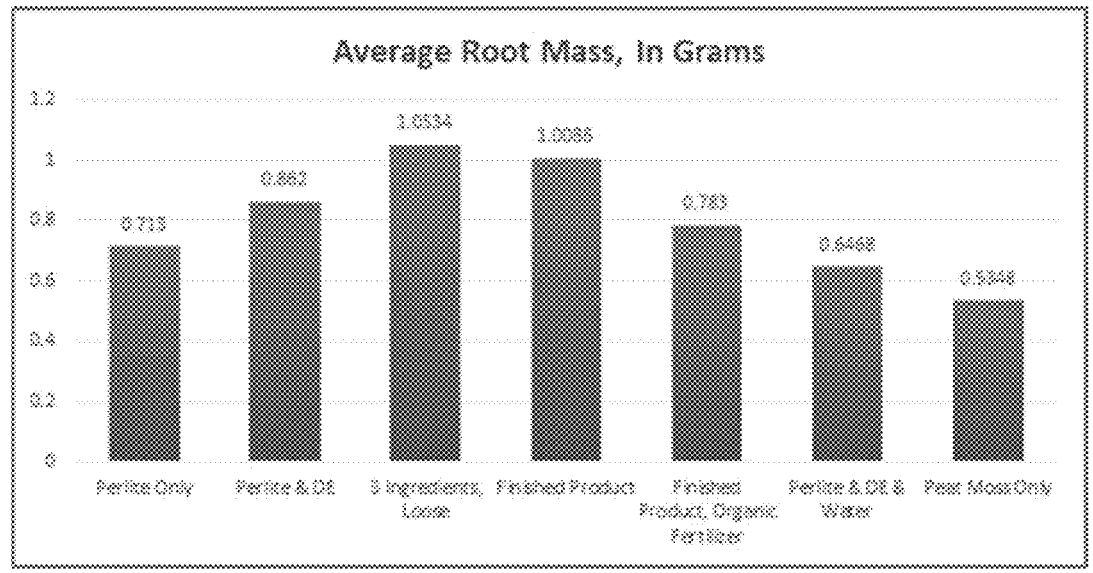
FIG. 3 is a graph showing enhanced growth characteristics of plants grown in the presence of one embodiment of the disclosed composition.

FIG. 3 shows the average root mass, in grams for plants grown in various combinations of perlite, diatomaceous earth, organic fertilizer, water, or the presently disclosed coated perlite composition. As shown, while applying both perlite and diatomaceous earth to the media (Perlite & DE") enhanced root mass by about 60% compared to peat moss alone (0.5348 g vs 0.862 g), and about 20% compared to perlite alone (Perlite Only"; 0.713 g vs 0.862 g) the disclosed composition ("Finished Product") enhanced root mass by nearly 20% compared to uncoated perlite and diatomaceous earth (0.862 g vs 1.0086 g).

These results evidence that the coating of perlite with diatomaceous earth, in addition to benefits in cost and time related to shipping, handling, application, etc., results in a surprisingly enhanced growth that is not seen when the individual components are applied separately.

Figure 4:
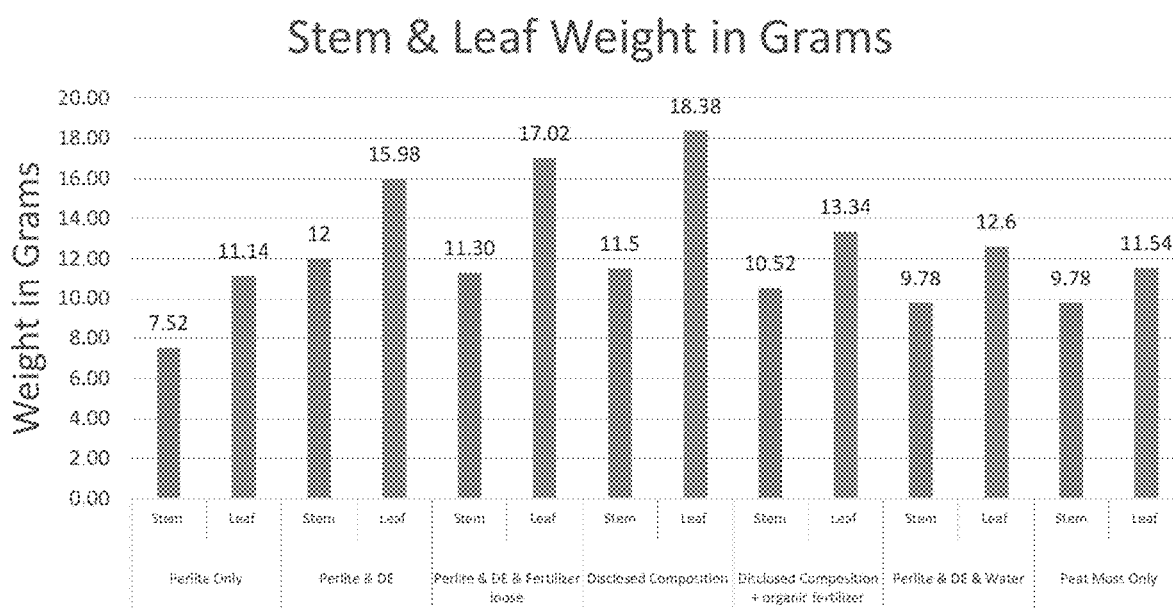
FIG. 4 is a graph showing enhanced growth characteristics of plants grown in the presence of one embodiment of the disclosed composition.

Other test results from the field test are presented in FIG. 4

Example 3—Field Studies

The same plants were also grown in field studies. Here again, the plants were planted with a peat moss base media. After 12 weeks growth, the plants were harvested and several characteristics of these plants were measured including THC total yield, dry flower weight, THC, total cannabinoids, total terpenes, etc. Some results from these studies are presented in Table 5, which shows average % change for various plants grown in the presently disclosed composition versus perlite and peat moss alone ("Perlite Only" vs "Peat Moss Only").

TABLE 5

| THC Total Yield | +183% |
| Dry Flower Wt | +79% |
| THC | +58% |
| Total Cannabinoids | +40% |
| Total Terpenes | +10% |

Figure 5:
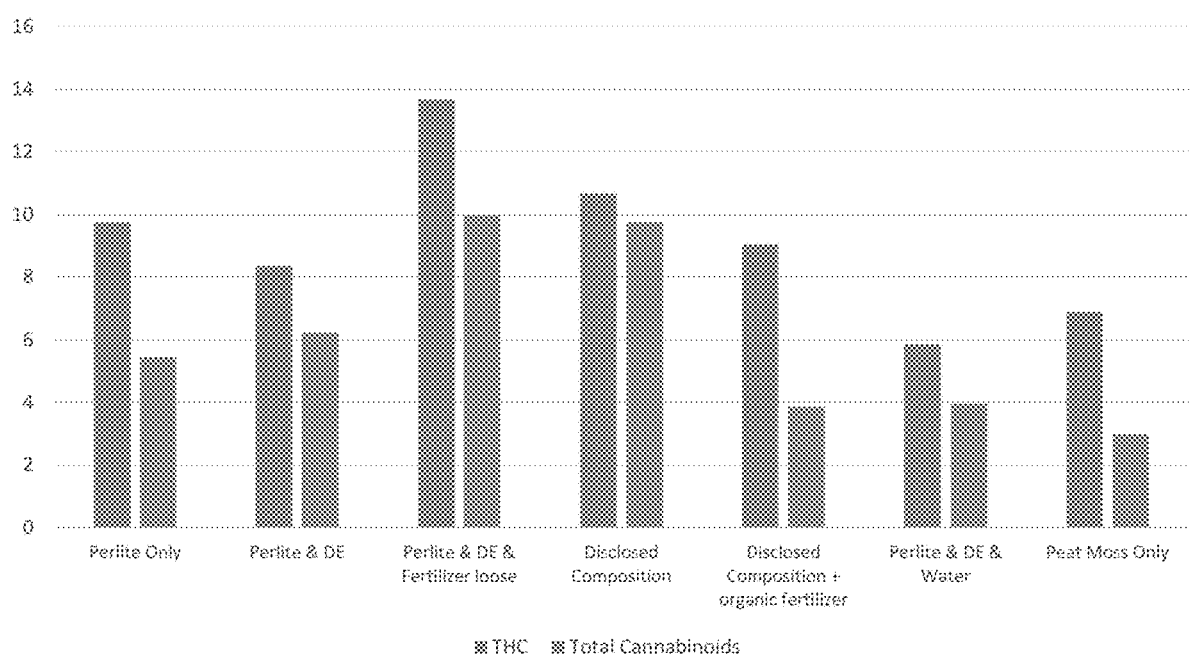
FIG. 5 is a graph showing enhanced growth characteristics of plants grown in the presence of one embodiment of the disclosed composition.

Other test results from the field test are presented in FIG. 5.

Example 4—12-Week Study of More than 100 *Cannabis* Plants Grown in Various Soilless Media Greater than about 100 plants were grown and studied. The plants were grown in the presently described coated perlite composition + and − various medias. One group was grown in peat moss (Sunshine White Peat) mixed with horticultural perlite at a ratio of 75/25. The objective was to determine the effect of the presently disclosed composition on *Cannabis* growth.

Plants were grown for 12 weeks with critical research assessments on shoot dry weight, root dry mass and analysis of leaf tissue nutrients, CBD, THC, and terpenes.

Based on this study, the results showed that the present composition enhanced flower bud yield by about 2× compared to peat moss+perlite alone. In addition, CBD content also increased by greater than 1.5×.

In some embodiments, the ability of the disclosed composition to control pests may be assessed. In these experiments, measurement may be done by visual inspection of the soil profile, using visual backgrounds (i.e. yellow sticky cards—in some cases, these cards may lure pests, which then stick to the surface of the card) and/or placement of an attractant at or near the plant or on top of the soil (in these embodiments, for example, a food such as a potato slice may be used to lure the pest, for example fungus gnat and/or larvae, to feed on the potato slice, thus allowing identification and counting).

While multiple embodiments are disclosed, still other embodiments of the present invention will become apparent to those skilled in the art from the following detailed description. As will be apparent, the invention is capable of modifications in various obvious aspects, all without departing from the spirit and scope of the present invention. Accordingly, the detailed description is to be regarded as illustrative in nature and not restrictive.

All references disclosed herein, whether patent or non-patent, are hereby incorporated by reference as if each was included at its citation, in its entirety. In case of conflict between reference and specification, the present specification, including definitions, will control.

Although the present disclosure has been described with a certain degree of particularity, it is understood the disclosure has been made by way of example, and changes in detail or structure may be made without departing from the spirit of the disclosure as defined in the appended claims.

We claim:

1. A soil amendment composition comprising:
   perlite particles, and
   diatomaceous earth (DE), wherein the perlite particles are coated with the DE and further wherein greater than about 75% of the coated perlite particles have an average size greater than about 10 mesh, or about 2.0 mm, and the soil amendment composition is sterile.

2. The composition of claim 1, wherein the ratio of perlite to diatomaceous earth is between 20:1 and 10:3 or 4:1 and 2:1 by volume.

3. The composition of claim 2, wherein the ratio of perlite to diatomaceous earth is about 3:1 by volume.

4. The composition of claim 1, comprising a fertilizer compound selected from one or more of nitrogen, phosphorous, potassium, and compounds comprising same.

5. The composition of claim 1, wherein the coating comprises at least one of nitrogen, phosphorous, or potassium.

6. The composition of claim 1, wherein the DE has an average pore size of between 1 and 50 microns (μm).

7. The composition of claim 1, wherein the DE has an average pore size of between about 13-19 microns.

8. The composition of claim 1, wherein about 90% of the coated perlite particles have an average size greater than about 30 mesh.

9. A method for making the soil amendment composition of claim 1, comprising:
   combining an amount of diatomaceous earth (DE) and a plurality of perlite particles;

mixing the plurality of perlite particles and DE to provide a coating of DE to the perlite particles, wherein greater than about 75% of the coated perlite particles have an average size greater than about 10 mesh, or about 2.0 mm, and the soil amendment composition is sterile.

10. The method of claim 9, further comprising;
mixing a fertilizer compound (FC) with the DE to create a DE+FC mixture; and
combining the DE+FC mixture and the plurality of perlite particles to provide a coating of DE+FC to the perlite particles.

11. The method of claim 10, wherein the fertilizer compound comprises at least one of nitrogen, phosphorous, or potassium.

12. The method of claim 9, wherein the ratio of the plurality of perlite particles to diatomaceous earth is between 20:1 and 10:3 or 4:1 and 2:1 by volume.

13. The method of claim 9, wherein the ratio of the plurality of perlite particles to diatomaceous earth is about 3:1 by volume.

14. The method of claim 9, wherein the DE has an average pore size of between 1 and 50 microns (µm).

15. The method of claim 9, wherein about 90% of the coated perlite particles have an average size greater than about 30 mesh.

16. A method of enhancing plant growth, comprising:
combining the soil amendment composition of claim 1 and
a grow media selected from one or more of peat, fiber, wood chips, dirt, sand, etc., to create an amended soil, wherein the amended soil comprises at least one plant, root, or seed;
allowing the plant, root, or seed to grow; and thereby
providing for enhanced growth of the plant, root, or seed as compared with a similar plant, root, or seed grown in the absence of the soil amendment.

17. The method of claim 16, wherein growth of the plant, root, or seed is enhanced by at least 5% over a plant, root, or seed grown in the grow media lacking the composition.

18. The method of claim 17, wherein the growth of the plant is assessed by one or more of time to emergence, plant height, dry plant weight, number of flowers, weight of flowers, or composition of flowers.

19. The method of claim 18, wherein a soil treated with the composition demonstrates enhanced characteristics.

20. The method of claim 16, further providing a fertilizer compound, wherein the fertilizer compound and the diatomaceous earth coat the perlite particles, and the fertilizer compound is selected from one or more of nitrogen, phosphorous, and potassium.

* * * * *